United States Patent
Hanisch et al.

(10) Patent No.: US 9,546,053 B2
(45) Date of Patent: Jan. 17, 2017

(54) TRANSPORT DEVICE AND METHOD FOR OPERATING THE TRANSPORT DEVICE

(71) Applicant: Robert Bosch GmbH, Stuttgart (DE)

(72) Inventors: Markus Hanisch, Fellbach (DE); Heinrich van de Loecht, Muggensturm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/770,106

(22) PCT Filed: Jan. 3, 2014

(86) PCT No.: PCT/EP2014/050037
§ 371 (c)(1),
(2) Date: Aug. 25, 2015

(87) PCT Pub. No.: WO2014/127920
PCT Pub. Date: Aug. 28, 2014

(65) Prior Publication Data
US 2016/0009505 A1    Jan. 14, 2016

(30) Foreign Application Priority Data

Feb. 25, 2013    (DE) .................. 10 2013 203 066

(51) Int. Cl.
*B65G 47/00*    (2006.01)
*B65G 54/02*    (2006.01)

(52) U.S. Cl.
CPC ............. *B65G 54/02* (2013.01); *B65G 54/025* (2013.01)

(58) Field of Classification Search
CPC ....... B65G 54/02; B65G 54/025; B60L 13/04; B60L 13/08

(Continued)

(56) References Cited

U.S. PATENT DOCUMENTS 3,834,318 A * 9/1974 Fellows .................. B60L 13/04
104/23.2
5,051,225 A    9/1991 Hommes et al.
(Continued)

FOREIGN PATENT DOCUMENTS

DE    102010027925    10/2011
JP    092255    1/1997
WO    0156854    8/2001

OTHER PUBLICATIONS

International Search Report for Application No. PCT/EP2014/050037 dated May 8, 2014 (English Translation, 2 pages).

*Primary Examiner* — William R Harp
(74) *Attorney, Agent, or Firm* — Michael Best & Friedrich LLP

(57) ABSTRACT

The invention relates to a transport device (1) for conveying a product, comprising a stationary running rail (2) which extends along a longitudinal axis (3); a cart (6) with a height axis (5) which is perpendicular to the longitudinal axis (3), said cart being guided on the running rail (2); guiding rollers (7) which are arranged on the cart (6), can be rotated about rotational axes (8) perpendicular to the longitudinal axis (3), and roll on the running rail (2), wherein the rotational axis (8) of each guiding roller (7) intersects the same straight line (9), which is perpendicular to the longitudinal axis (3); and a compensating device for compensating for a yaw moment (M) of the cart (6) about the height axis (5), comprising multiple magnetic coils (12) arranged along the running rail (2), at least two ferromagnetic or permanent magnetic counter elements (11) which are arranged on the cart (6) and which are arranged on both sides of the running rail (2), and a control device (18) for controlling the magnetic coils (12) such that the counter elements (11) can be simultaneously pushed away from the running rail (2) in the direction of a transverse axis (4), said transverse axis (4) being defined as (Continued)

perpendicular to the longitudinal axis (3) and perpendicular to the height axis (5).

20 Claims, 5 Drawing Sheets

(58) Field of Classification Search
USPC .......................................................... 198/619
See application file for complete search history.

(56) References Cited

U.S. PATENT DOCUMENTS

| | | | |
|---|---|---|---|
| 6,357,358 B2* | 3/2002 | Henderson | B60L 13/04 |
| | | | 104/130.02 |
| 6,684,794 B2* | 2/2004 | Fiske | B60L 13/04 |
| | | | 104/281 |
| 8,960,099 B2* | 2/2015 | Hosek | H01L 21/67161 |
| | | | 104/282 |
| 2006/0219128 A1 | 10/2006 | Li | |
| 2011/0100252 A1 | 5/2011 | Fukukawa | |
| 2015/0274433 A1* | 10/2015 | Hanisch | B65G 54/02 |
| | | | 198/805 |

* cited by examiner

PRIOR ART

TRANSPORT DEVICE AND METHOD FOR OPERATING THE TRANSPORT DEVICE

BACKGROUND OF THE INVENTION

The present invention relates to a transport device for conveying a product as well as to a method for operating the transport device.

Transport systems for conveying products are, for example, used in conveying applications of packaging machines and are known in different embodiments from the prior art. The German patent publication DE 10 2010 027 925 A1 describes, for example, a transport system in which a movable conveyor cart is moved by means of a linear motor drive device. The conveyor cart is thus designed in an articulated manner in order to be able to pass through smaller curve radii. Situations can, however, arise during the operation in which the conveyor carts yaw about the height axis thereof. In a schematically simplified depiction, FIG. 5 shows how this yaw moment M is stabilized in the prior art. According to FIG. 5, a conventional conveyor cart 106 comprises at least three guiding rollers 107 that are offset to one another. Said guiding rollers 107 roll on a corresponding running rail. The yaw moment M can be stabilized by means of the offset arrangement of the guiding rollers 107. In the arrangement according to the prior art, the three forces F1, F2 and F3 must not align so that the yaw moment M can be absorbed in both directions. As a result, a minimum overall size that is greater than 2 times the diameter of the guiding rollers 107 is necessarily required if an arrangement is desired in a single plane in order to prevent parasitic moments. In addition, the guiding rollers 107 that are arranged offset to one another (on the right side in FIG. 5) cannot execute an ideal rolling motion because the rotational axis thereof does not extend through the center point of the circular path. This leads to a transverse movement of the guiding rollers and thus to a relatively high wear and a premature failure of said rollers. As a result, many particles are unnecessarily abraded which are especially undesirable in the area of food and pharmaceutical products or, respectively, food and pharmaceutical packagings.

SUMMARY OF THE INVENTION

The transport device according to the invention facilitates a very compact and light design of the conveyor cart. The light design is also associated with an energy efficient construction of the transport device because the smallest possible masses have to be moved. Because, according to the invention, the guiding rollers are no longer arranged offset to one another, the guiding rollers can roll optimally and therefore have a minimal amount of wear. In so doing, the service life of the guiding rollers increases; and at the same time, as few particles as possible are generated by abrasion. These advantages are achieved by a transport device comprising a stationary running rail which extends along a longitudinal axis and at least one cart which is guided on the running rail. The cart comprises guiding rollers. In particular, two guiding rollers are provided. The guiding rollers are arranged rotatably on the cart. The rotational axes of the guiding rollers are parallel to the height axis of the cart. The height axis is defined as perpendicular to the longitudinal axis. A transverse axis is defined as perpendicular to the longitudinal axis and perpendicular to the height axis. The rotational axis of each guiding roller intersects the same straight line. This straight line is defined as perpendicular to the longitudinal axis and extends in the transverse direction. From an ideal point of view, said straight line is aligned perpendicularly to the longitudinal axis. As soon as a small yaw moment occurs about the height axis, which is not immediately compensated, the imaginary straight line deflects somewhat. The crucial factor is, however, that provision is made according to the invention for a yaw moment about the height axis not to be stabilized by arranging the guiding rollers offset to one another. The transport device furthermore comprises a compensating device for compensating for the yaw moment of the cart about the height axis. This compensating device comprises multiple magnetic coils arranged along the running rail and at least two ferromagnetic or permanent magnetic counter elements which are arranged on the cart. Said counter elements are arranged on both sides of the running rail. In addition, the compensating device comprises a control device for controlling the magnetic coils. The magnetic coils are thereby actuated in such a manner that the counter elements are simultaneously pushed away from the running rail in the direction of the transverse axis. The two counter elements, which lie opposite one another, being pushed away from the running rail leads to a stabilization of the yaw moment and hence to a centered alignment of the cart. The magnetic forces utilized here increase inversely proportional to the square of the distance. That means that the further the cart is skewed by a yaw moment which arises, the stronger the corresponding force acts on the counter element approaching the running rail. A complicated control of the actuation of the magnetic coils is therefore not necessary because the arising force behaves inversely proportional to the square of the distance.

A magnetic drive is particularly provided for the transport device. This magnetic drive comprises stationary primary magnets, for example designed as electromagnets, and secondary magnets interacting with the primary magnets. The secondary magnets are arranged on the cart. Provision is particularly made for the secondary magnets to only be used for the drive and for the counter elements to only be used for the compensating device.

In order to achieve as compact of a design of the stationary running rail as possible, the magnetic coils of the compensating device can be used in a preferred manner simultaneously as primary magnets of the magnetic drive. This is achieved by a corresponding actuation respectively energization of the magnetic coils. It is also alternatively possible for the primary magnets to regulate their own coils which are independent of the compensating device. In so doing, the control is simplified because the magnetic coils of the compensating device can be actuated completely independently of the drive.

Provision is furthermore made for the counter elements to be arranged in the direction of the longitudinal axis upstream and/or downstream of the straight line which is intersected by the rotational axes of the guiding rollers. By means of the counter elements being spaced apart from said straight line at a correspondingly large distance, the lever can be adjusted for the yaw moment compensation.

The counter elements are particularly designed as permanent magnets. There are two options for the alignment of the permanent magnets: In the first option, the south poles of the counter elements are oriented towards the magnetic coils on both sides of the running rail, or the north poles of the counter elements are oriented towards the magnetic coils on both sides of the running rail. In the first option, there is a repelling force exerted on the counter elements even if current is not passed through the magnetic coil.

In the second option, the south pole of the counter element is oriented towards the magnetic coils on one side of the running rail, and the north pole of the counter element is oriented towards the magnetic coils on the other side of the running rail. In this case, it is necessary for current to be constantly passed through the magnetic coil in order to generate a repelling force on the counter elements.

Instead of two separate counter elements, a return element can be used in a preferred manner. The return element is ferromagnetic and is designed U- or C-shaped. The return element thereby engages around the running rails so that the ends of said return element are disposed on both sides of the running rail. The two counter elements are thus integrated into said return element or, respectively, are formed by said return element. A permanent magnet is preferably inserted into said return element in order to generate a south and a north pole on both sides of the running track.

The invention further comprises a method for operating the transport device as said device was just described. Provision is made in the method for the counter elements to be aligned and/or for current to be passed through the magnetic coils such that the counter elements are repelled by the magnetic coils.

If a drive is additionally provided for the cart, the primary magnets of the drive are energized for the propulsion such that the counter elements of the compensating device and/or the secondary magnets of the drive are attracted by the primary magnets. The counter elements of the compensating device can therefore also be used simultaneously to drive the cart. With regard to the compensating device, current is passed particularly through the first and the last coil which still lie in the region of the cart.

BRIEF DESCRIPTION OF THE DRAWINGS

Exemplary embodiments of the invention are subsequently described in detail with reference to the accompanying drawings. In the drawings.

DETAILED DESCRIPTION

Figure 1:
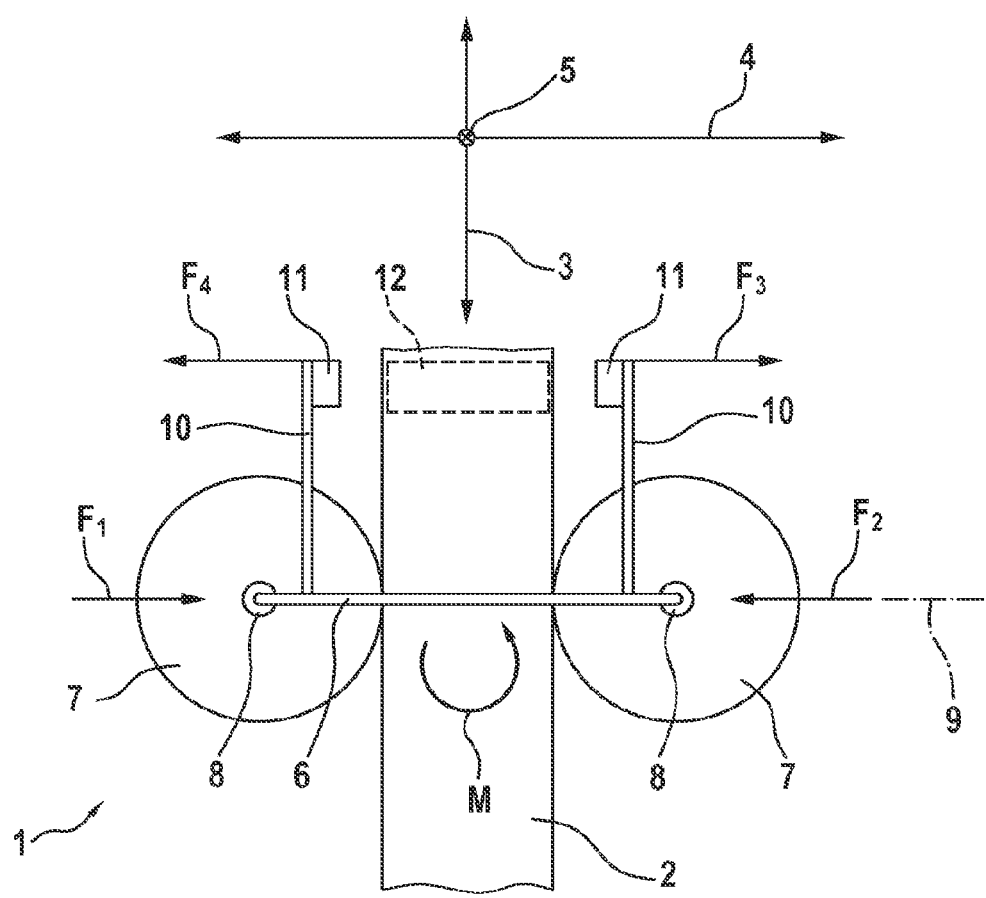
FIG. 1 shows a schematically simplified view of an inventive transport device according to a first exemplary embodiment.

FIG. 1 shows the transport device 1 in a schematically simplified depiction. The transport device 1 comprises a stationary running rail 2. A cart 6 is guided on the running rail 2. The running rail 2 extends along a longitudinal axis 3. The cart 6 can be moved linearly in the direction of the longitudinal axis 3. A transverse axis 4 is defined as perpendicular to the longitudinal axis 3. A height axis 5 is defined as perpendicular to the transverse axis 4 and perpendicular to the longitudinal axis 3. The moment of the cart 6 about the height axis 5 is referred to as the yaw moment M.

The cart 6 has two guiding rollers 7. Each guiding roller 7 is mounted on the cart 6 so as to be rotationally movable about a rotational axis 8. The two rotational axes 8 intersect a straight line 9. The straight line 9 is defined as perpendicular to the longitudinal axis 3 when the cart is centrally aligned. By means of this aligned arrangement of the guiding rollers 7, the two forces F1 and F2 also align to support the cart 6 via the guiding rollers 7. Because the forces F1 and F2 align, an additional compensating device for compensating for the yaw moment M is provided.

This compensating device comprises two extension arms 10 which extend in the longitudinal direction. Counter elements 11 are provided on both of these extension arms 10. The counter elements 11 are disposed on both sides of the running rail 2 and are designed as permanent magnets. A plurality of magnetic coils 12 is situated at or in the running rail 2. When current is passed through said magnetic coils 12, the counter elements 10 are pushed away from the running rail 2 in the direction of the transverse axis 4.

Figure 2:
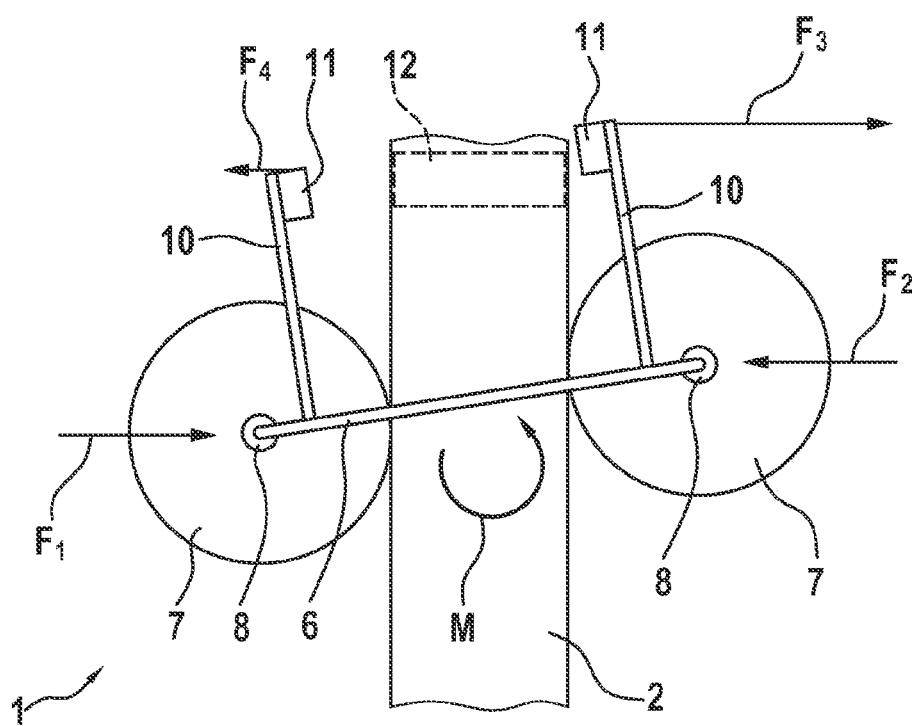
FIG. 2 shows a further schematically simplified view of the inventive transport device according to the first exemplary embodiment.

FIG. 2 shows a state in which the cart 6 is skewed as a result of the yaw moment M. In this case, the force F3 acting on the right counter element 11 increases. The force F3 leads to a stabilization of the yaw moment M so that the equilibrium position according to FIG. 1 occurs again.

Figure 3:
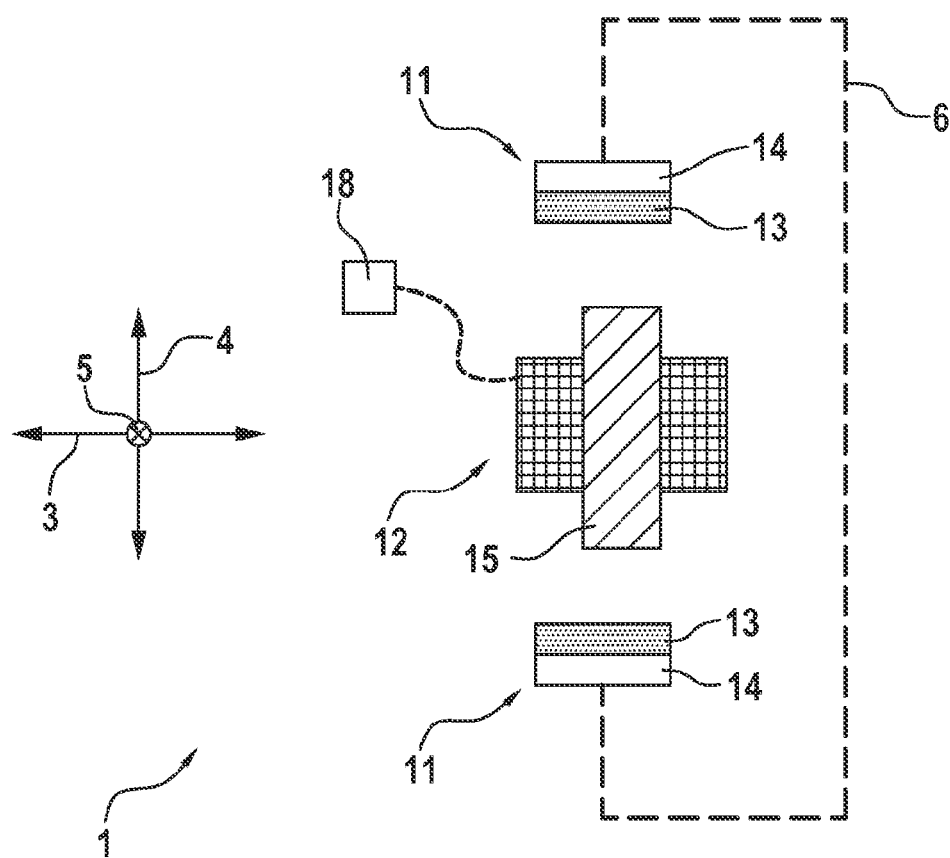
FIG. 3 shows a detailed view of the inventive transport device according to the first exemplary embodiment.

FIG. 3 shows, likewise in a schematically simplified depiction, details of the transport device 1. In FIG. 3, the two counter elements 11 are shown in detail. The remaining portion of the cart 6 is only depicted by a dashed line. The running rail 2 is hidden. Only one of the magnetic coils 12 can be seen.

The two counter elements 11 each have a north pole 13 and a south pole 14. The counter elements 11 are disposed in such a manner that the two north poles 13 point towards the magnetic coil 12. The magnetic coil 12 comprises an iron core 15.

The magnetic coils 12 distributed along the running rail 2 are actuated or, respectively, energized by means of a control device 18.

Figure 4:
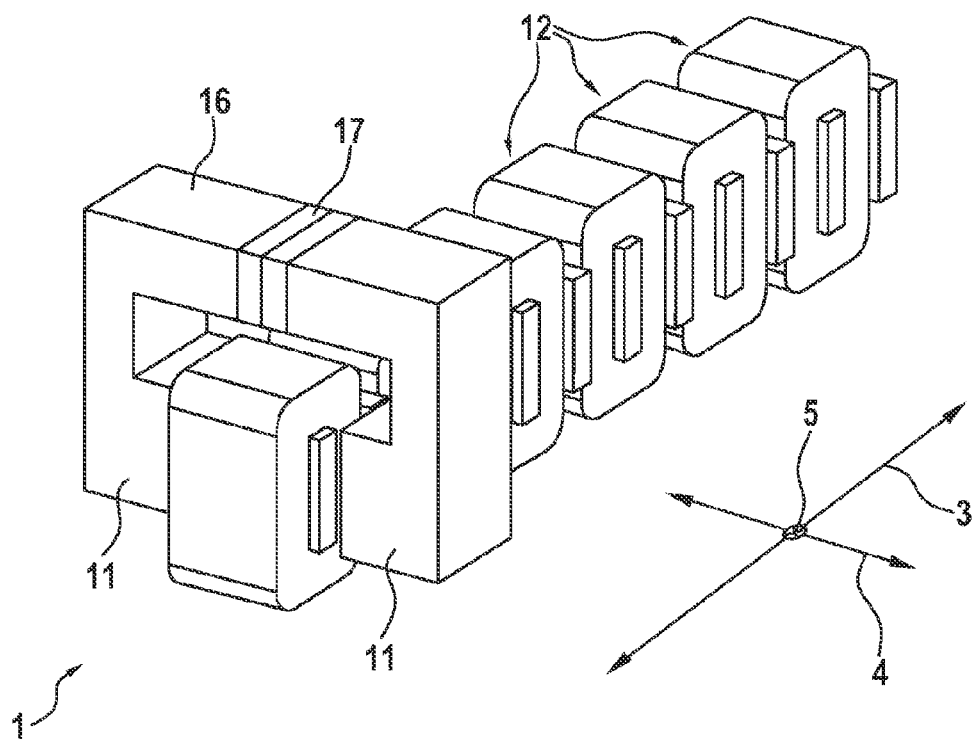
FIG. 4 shows details of the inventive transport device according to a second exemplary embodiment.
Figure 5:
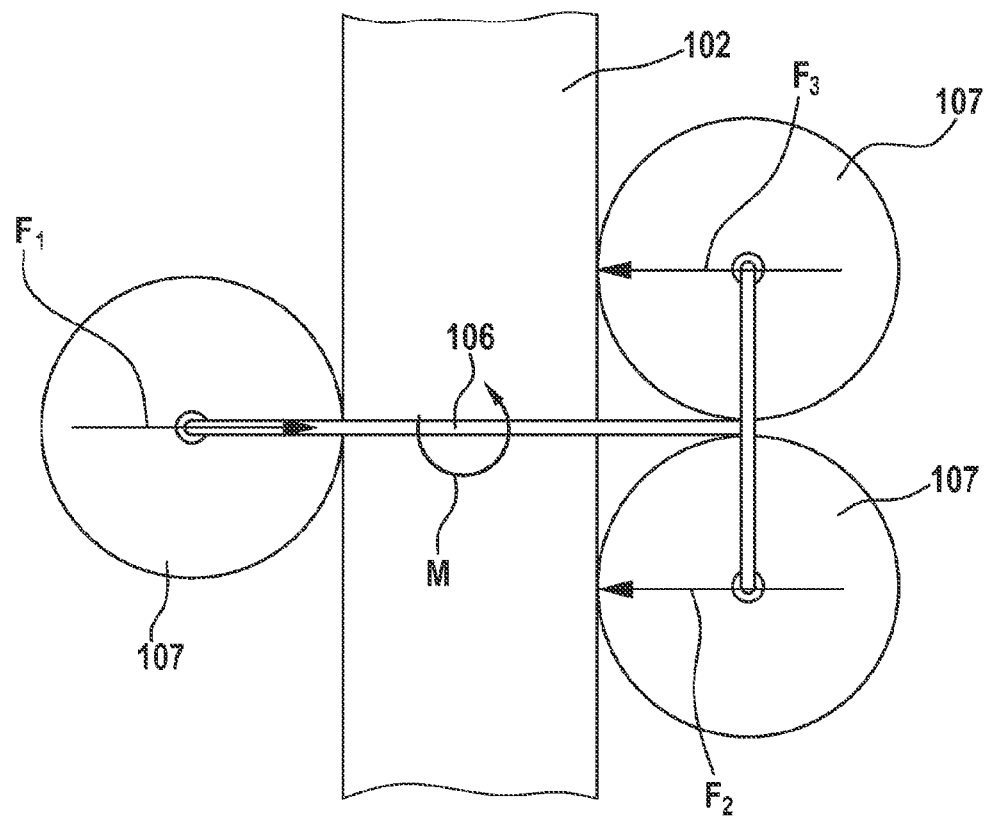
FIG. 5 shows a schematic view of a transport device according to the prior art.

As an alternative to the arrangement analogous to FIG. 3, the coil can also be designed as an air coil, which results in a significant reduction in the parasitic attraction if the magnets are disposed in similar fashion to FIG. 4. In this case too, current would have to be continuously passed through the magnetic coils in order to compensate for the yaw moment.

FIG. 4 shows details of the transport device 1 according to the second exemplary embodiment. In FIG. 4, the running rail 2 is hidden. The magnetic coils 12 can be seen arranged adjacently to one another in a row.

In addition, FIG. 4 shows a return element 16 as a component of the cart 6. This return element 16 consists of a ferromagnetic material, in particular iron and is configured U- or C-shaped. The ends of the return element 15 are situated on both sides of the running rail 2 and constitute the two counter elements 11. A permanent magnet 17 is inserted into the return element 16.

The invention claimed is:

1. A transport device (1) for conveying a product, comprising:
   a stationary running rail (2) which extends along a longitudinal axis (3);
   a cart (6) with a height axis (5) which intersects and is perpendicular to the longitudinal axis (3), said cart being guided on the running rail (2);
   guiding rollers (7) which are arranged on the cart (6), are configured to be rotated about rotational axes (8) perpendicular to the longitudinal axis (3), and roll on the running rail (2), wherein a rotational axis (8) of each guiding roller (7) intersects the same straight line (9), which is perpendicular to the longitudinal axis (3); and a compensating device for compensating for a yaw moment (M) of the cart (6) about the height axis (5), the compensating device comprising multiple magnetic coils (12) arranged along the running rail (2), at least two ferromagnetic or permanent magnetic counter elements (11) which are arranged on the cart (6) and which are arranged on both sides of the running rail (2), and a control device (18) for controlling the magnetic coils (12) such that the counter elements (11) can be simultaneously pushed away from the running rail (2) in a direction of a transverse axis (4), said transverse axis (4) being defined as perpendicular to the longitudinal axis (3) and perpendicular to the height axis (5).

2. The transport device according to claim 1, wherein a magnetic drive comprising stationary primary magnets and secondary magnets which are arranged on the cart (6) and interact with the primary magnets, wherein said secondary magnets are configured to be used only for the drive and the counter elements (11) are configured to be used only for the compensating device.

3. The transport device according to claim 2, wherein the magnetic coils (12) of the compensating device are configured to be used as permanent magnets of the magnetic drive.

4. The transport device according to claim 2, wherein distinct coils independent of the compensating device are implemented for the primary magnets.

5. The transport device according to claim 1, wherein the counter elements (11) are disposed in a direction of the longitudinal axis (3) upstream and/or downstream of the straight line (9) which is intersected by the rotational axes (8) of the guiding rollers (7).

6. The transport device according to claim 1, wherein the counter elements (11) are permanent magnets, wherein south poles (14) of the counter elements (11) are oriented towards the magnetic coils (12) on both sides of the running rail (2), or wherein north poles (13) of the counter elements (11) are oriented towards the magnetic coils (12) on both sides of the running rail (2).

7. The transport device according to claim 1, wherein the counter elements (11) are permanent magnets, wherein a south pole (14) of the counter element (11) is oriented towards the magnetic coils (12) on one side of the running rail (2), and a north pole (13) of the counter element (11) is oriented towards the magnetic coils (12) on the other side of the running rail (2).

8. The transport device according to claim 1, wherein the counter elements (11) are integrated into a ferromagnetic, U- or C-shaped return element (16) which engages around the running rail (2).

9. A method for operating the transport device according to claim 1, the method comprising aligning the counter elements (11) such that the counter elements (11) are repelled by the magnetic coils (12).

10. The method according to claim 9, wherein a magnetic drive comprising stationary primary magnets and secondary magnets which are arranged on the cart (6) and interact with the primary magnets, wherein said secondary magnets are configured to be used only for the drive and the counter elements (11) are configured to be used only for the compensating device, and the method further comprising, in order to drive the cart, energizing the primary magnets of the drive such that the counter elements (11) of the compensating device are attracted by the primary magnets.

11. The method according to claim 9, wherein a magnetic drive comprising stationary primary magnets and secondary magnets which are arranged on the cart (6) and interact with the primary magnets, wherein said secondary magnets are configured to be used only for the drive and the counter elements (11) are configured to be used only for the compensating device, and the method further comprising, in order to drive the cart, energizing the primary magnets of the drive such that the secondary magnets of the drive are attracted by the primary magnets.

12. The method according to claim 11, the method further comprising, in order to drive the cart, energizing the primary magnets of the drive such that the counter elements (11) of the compensating device are attracted by the primary magnets.

13. A method for operating the transport device according to claim 1, wherein the method comprising energizing the magnetic coils (12) such that the counter elements (11) are repelled by the magnetic coils (12).

14. The method for operating the transport device according to claim 13, wherein the method further comprising aligning the counter elements (11) such that the counter elements (11) are repelled by the magnetic coils (12).

15. The method according to claim 14, wherein a magnetic drive comprising stationary primary magnets and secondary magnets which are arranged on the cart (6) and interact with the primary magnets, wherein said secondary magnets are configured to be used only for the drive and the counter elements (11) are configured to be used only for the compensating device, and the method further comprising, in order to drive the cart, energizing the primary magnets of the drive such that the counter elements (11) of the compensating device are attracted by the primary magnets.

16. The method according to claim 14, wherein a magnetic drive comprising stationary primary magnets and secondary magnets which are arranged on the cart (6) and interact with the primary magnets, wherein said secondary magnets are configured to be used only for the drive and the counter elements (11) are configured to be used only for the compensating device, and the method further comprising, in order to drive the cart, energizing the primary magnets of the drive such that the secondary magnets of the drive are attracted by the primary magnets.

17. The method according to claim 16, the method further comprising, in order to drive the cart, energizing the primary magnets of the drive such that the counter elements (11) of the compensating device are attracted by the primary magnets.

18. The method according to claim 13, wherein a magnetic drive comprising stationary primary magnets and secondary magnets which are arranged on the cart (6) and interact with the primary magnets, wherein said secondary magnets are configured to be used only for the drive and the counter elements (11) are configured to be used only for the compensating device, and the method further comprising, in order to drive the cart, energizing the primary magnets of the drive such that the counter elements (11) of the compensating device are attracted by the primary magnets.

19. The method according to claim 13, wherein a magnetic drive comprising stationary primary magnets and secondary magnets which are arranged on the cart (6) and interact with the primary magnets, wherein said secondary magnets are configured to be used only for the drive and the counter elements (11) are configured to be used only for the compensating device, and the method further comprising, in order to drive the cart, energizing the primary magnets of the drive such that the secondary magnets of the drive are attracted by the primary magnets.

20. The method according to claim 19, the method further comprising, in order to drive the cart, energizing the primary magnets of the drive such that the counter elements (11) of the compensating device are attracted by the primary magnets.

* * * * *